(12) United States Patent
Minh et al.

(10) Patent No.: US 10,706,009 B2
(45) Date of Patent: Jul. 7, 2020

(54) TECHNIQUES TO PARALLELIZE CPU AND IO WORK OF LOG WRITES

(71) Applicant: Oracle International Corporation, Redwood Shores, CA (US)

(72) Inventors: Chi Cao Minh, Redwood Shores, CA (US); Yunrui Li, Fremont, CA (US); Jonghyun Lee, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/831,489

(22) Filed: Mar. 14, 2013

(65) Prior Publication Data

US 2014/0279917 A1  Sep. 18, 2014

(51) Int. Cl.
*G06F 16/13* (2019.01)

(52) U.S. Cl.
CPC .................................. *G06F 16/13* (2019.01)

(58) Field of Classification Search
CPC ........... G06F 17/30091; G06F 11/1471; G06F 17/30008; G06F 17/30368; G06F 11/1458; H05K 999/99; H05K 999/1458
USPC ........................................................ 707/648
See application file for complete search history.

(56) References Cited

U.S. PATENT DOCUMENTS

| | | | | |
|---|---|---|---|---|
| 6,131,094 A * | 10/2000 | Gord | ................. | G06F 16/24569 707/E17.007 |
| 6,298,345 B1 * | 10/2001 | Armstrong et al. | | |
| 6,493,837 B1 * | 12/2002 | Pang et al. | ....................... | 714/45 |
| 6,584,477 B1 * | 6/2003 | Mosher, Jr. | .................... | 707/610 |
| 6,732,124 B1 * | 5/2004 | Koseki | ................ | G06F 11/1435 707/999.1 |
| 6,769,003 B2 * | 7/2004 | Park et al. | ..................... | 707/703 |
| 7,039,773 B2 * | 5/2006 | Hu | ......................... | G06F 16/284 711/158 |
| 7,406,487 B1 * | 7/2008 | Gupta | ................. | G06F 16/1844 707/E17.032 |
| 7,809,691 B1 * | 10/2010 | Karmarkar | ........... | G06F 11/1469 707/674 |
| 7,890,466 B2 * | 2/2011 | Kundu et al. | ................. | 707/648 |
| 7,890,469 B1 * | 2/2011 | Maionchi | .......... | G06F 17/30067 707/654 |
| 7,930,274 B2 * | 4/2011 | Hwang et al. | ................ | 707/648 |

(Continued)

OTHER PUBLICATIONS

HelloDBA.com. "Oracle Redo Strand", Dated Dec. 18, 2009, http://www.hellodba.com/reader.php?ID=28, 6 pages.

*Primary Examiner* — Pierre M Vital
*Assistant Examiner* — Andrew N Ho
(74) *Attorney, Agent, or Firm* — Hickman Palermo Becker Bingham LLP (57) ABSTRACT

Techniques are provided for managing cached data objects in a mixed workload environment. In an embodiment, a system, log data is stored in one or more buffers. In response to receiving a request to perform a logical write, a first process writes a first portion of the log data to a log file in persistent storage. While the first portion of the log data is being written to the log file, a second process writes a second portion of the log data in the one or more buffers to the log file in persistent storage. In another embodiment, a request to perform a second logical write may be received before the first logical write completes. While the first log data is being written to the log file, one or more processes write second log data for the second logical write to the log file.

23 Claims, 6 Drawing Sheets

(56) References Cited

U.S. PATENT DOCUMENTS

| | | | |
|---|---|---|---|
| 8,024,297 B2 * | 9/2011 | Gladkov et al. | 707/648 |
| 8,046,334 B2 * | 10/2011 | Hwang et al. | 707/648 |
| 8,060,470 B2 * | 11/2011 | Davidson et al. | 707/634 |
| 8,090,691 B2 * | 1/2012 | Lynn | 707/648 |
| 8,108,350 B2 * | 1/2012 | Rohwedder et al. | 707/648 |
| 8,868,514 B2 * | 10/2014 | Lomet et al. | 707/682 |
| 9,361,306 B1 * | 6/2016 | Pawar | G06F 16/1865 |
| 2002/0178177 A1 * | 11/2002 | Park | G06F 16/2358 |
| | | | 707/999.202 |
| 2003/0093439 A1 * | 5/2003 | Mogi et al. | 707/200 |
| 2006/0047684 A1 * | 3/2006 | Cherkauer | G06F 17/30368 |
| | | | 707/102 |
| 2006/0101033 A1 * | 5/2006 | Hu | G06F 11/1471 |
| | | | 714/E11.13 |
| 2006/0136686 A1 * | 6/2006 | Cherkauer | G06F 11/1471 |
| | | | 711/162 |
| 2006/0224634 A1 * | 10/2006 | Hahn | G06F 17/30368 |
| | | | 707/200 |
| 2008/0294705 A1 * | 11/2008 | Brauckhoff | G06F 12/08 |
| | | | 707/205 |
| 2010/0011026 A1 * | 1/2010 | Saha et al. | 707/200 |
| 2011/0137864 A1 * | 6/2011 | Deshmukh et al. | 707/648 |
| 2011/0246429 A1 * | 10/2011 | Prahlad | G06F 17/30212 |
| | | | 707/679 |
| 2011/0282842 A1 * | 11/2011 | Popovski et al. | 707/649 |
| 2012/0041926 A1 * | 2/2012 | Kundu et al. | 707/648 |
| 2012/0072395 A1 * | 3/2012 | Lynn | 707/648 |
| 2012/0166743 A1 * | 6/2012 | Lewis | G06F 16/1815 |
| | | | 711/154 |
| 2013/0073532 A1 * | 3/2013 | Bachar | G06F 7/32 |
| | | | 707/704 |
| 2013/0086092 A1 * | 4/2013 | James | G06F 17/30551 |
| | | | 707/758 |
| 2013/0117234 A1 * | 5/2013 | Schreter | G06F 17/30368 |
| | | | 707/674 |
| 2013/0117236 A1 * | 5/2013 | Schreter | G06F 11/1402 |
| | | | 707/682 |

* cited by examiner

TECHNIQUES TO PARALLELIZE CPU AND IO WORK OF LOG WRITES

FIELD OF THE INVENTION

The present disclosure relates generally to techniques for performing log writes in a computer system and, more specifically, to techniques for parallelizing central processing unit (CPU) and input/output (I/O) work when performing log writes.

BACKGROUND

For performance reasons, database management systems (DBMS) typically implement write-ahead logging. According to this technique, database transactions are logged to disk before those transactions are considered committed. Thus, writing to the log is in the critical path of a transaction commit operation and can become a performance bottleneck.

Other systems also maintain logs for a variety of reasons. For example, journaling file systems use a variant of write-ahead logging referred to as journaling. According to this technique, the file system stores log data in a journal. The journal is a circular log file that records changes to the file system before those changes are applied. In the event of a power failure or system crash, the file system can read the log data from the journal to reapply the changes and prevent data corruption.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Techniques are described herein for parallelizing CPU and I/O work of log writes. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to techniques described herein, a plurality of log write processes perform parallel writes to a single log file. This allows the load of performing log writes to be distributed across multiple CPUs. In contrast to writing to multiple logs, writing to a single log simplifies log management since there are fewer logs and removes the need to sort the logs to have the contents in chronological order. In addition, having a single log may preserve the log format in certain systems which allows compatibility with older logs generated by legacy systems.

In an embodiment, a system, such as a DBMS or a journaling file system, generates a group of processes to perform a logical write. The group of processes includes a head worker for performing serial operations and a set of base workers for performing parallel write operations. When a request to write log data is received, each process in the group may write a different portion of the log data to the log file in parallel. The system may generate multiple groups to handle multiple write requests. Thus, the system may parallelize a single logical write and/or multiple logical writes.

In another embodiment, the system may regulate pipeline writes based on the size of the writes. According to the techniques described below, pipelining writes increases the log write throughput by allowing multiple outstanding log writes to occur in parallel. In some instances, however, pipelined writes may lead to a large variance in the size of log writes. By considering the log write size before starting a pipelined write, the system may more efficiently use an I/O subsystem.

In another embodiment, parallel log writing may be dynamically enabled or disabled. Using multiple processes may not be advantageous in all situations. Accordingly, the system may monitor certain metrics to determine when parallel log writing is optimal.

System Overview

In an embodiment, a plurality of processes are configured to concurrently write log data to a single log file. The plurality of processes are herein referred to as "log write workers." The log write workers may comprise independent processes and/or threads that are contained inside a single process, depending on the particular implementation. Accordingly, the term "process" as used herein may include processes and/or threads.

Figure 1A:
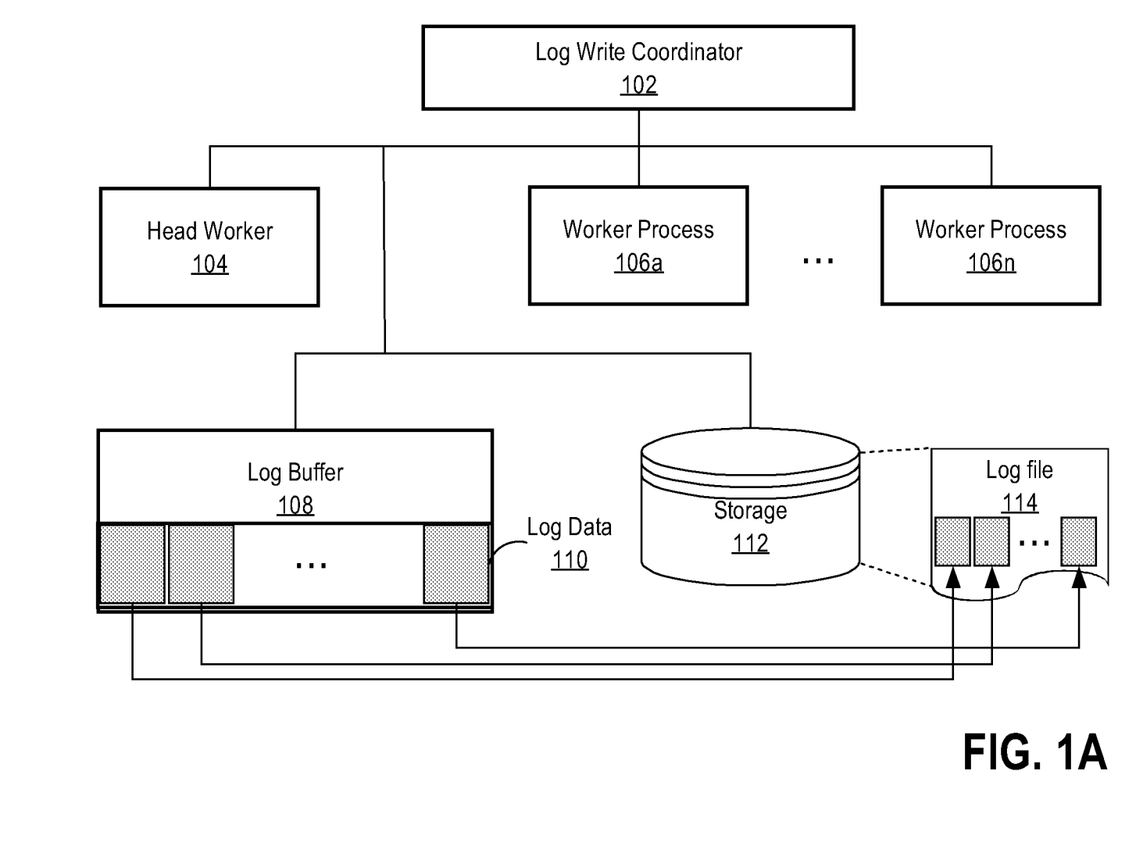
FIG. 1A is a block diagram illustrating an example system for performing a parallel write to a single log file, according to an embodiment.

FIG. 1A is a block diagram illustrating an example system for performing a parallel write to a single log file, according to an embodiment. The system generally comprises log write coordinator 102 and a plurality of log write workers, including head worker 104 and base worker process(es) 106a to 106n. The system further comprises log buffer 108 and storage 112.

Log write coordinator 102 coordinates writes of log data 110 from log buffer 108 to a log file 114 in storage 112. For example, log write coordinator 102 may communicate with head worker 104 and base worker process(es) 106a to 106n to instruct when and which log data to write from log buffer 108 to storage 112. Techniques for synchronizing parallel log writes are described in further detail below.

Head worker 104 and base worker process(es) 106a to 106n are a group of log write workers responsible for writing log data accumulated in log buffer 108 to storage 112. Head worker 104 is a process responsible for performing serial operations associated with a log write. Serial operations comprise operations that are performed in a particular order during the logical write. In some embodiments, one or more serial operations are performed before writing the log data to storage 112. In other embodiments, one or more serial operations are performed after writing the log data to storage 112. Base worker process(es) 106a to 106n comprise n processes, where n represents a positive integer, and perform operations that can be parallelized, such as writing of log data to storage 112. In yet another embodiment, the group of log write workers may be a single head worker process.

Log write coordinator 102 and the log write workers may be processes of a DBMS, a journaling file system, or any other program or set of programs that perform data logging operations.

Log buffer 108 is a memory cache that stores log data as it is generated. The log data that is stored may vary from implementation to implementation. In an embodiment, the log data may include information on how to redo or undo a transaction. For example, the log data may comprise a set of one or more change vectors, where each change vector is a description of a change made or requested to a set of one or more data blocks in persistent storage 112. In another example, the log data may comprise copies of data blocks that will later be written to a database or file system.

Storage 112 is persistent storage, such as disk, that stores log file 114. Storage 112 may also store other data to which change requests are directed. Examples include, without limitation, tables, partitions, directories, files and other database and filesystem objects. In an embodiment, storage 112 is a database that stores a set of database objects. In another embodiment, storage 112 is a file system that stores a set of files and directories. Log file 114 is a computer file that stores log data in persistent storage. In an embodiment, log file 114 has an associated file name and stores data according to a predefined format. The format may be indicated by the filename extension. In another embodiment, log file 114 stores log data for a single database instance. Storage 112 may store separate log files for other database instances. Each database instance may write to its own log file according to the techniques described herein.

Figure 1B:
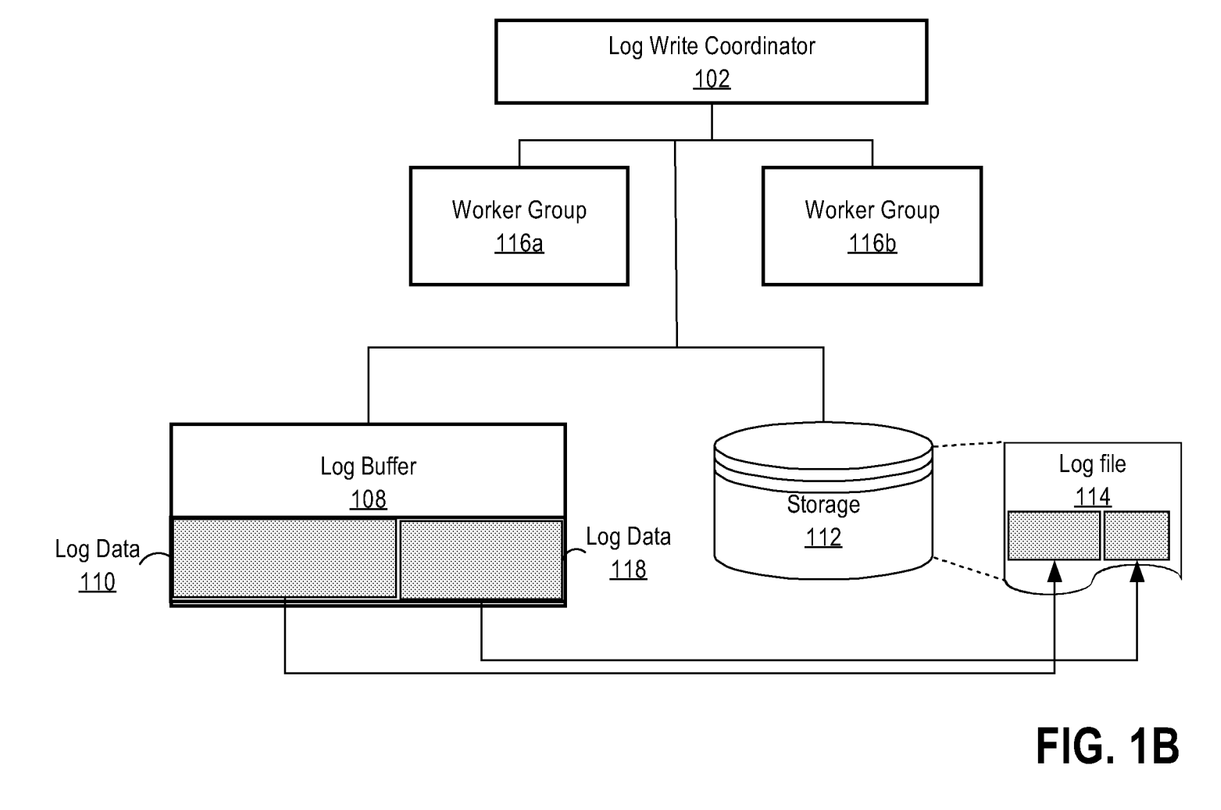
FIG. 1B is a block diagram illustrating an example system for performing a parallel write to a single log file, according to an embodiment.

FIG. 1B is a block diagram illustrating an example system for performing a parallel write to a single log file, according to an embodiment. The system comprises a plurality of worker groups, including worker group 116a and worker group 116b. The system may also comprise other worker groups, which are not illustrated for purposes of brevity. Each worker group comprises a head worker, such as head worker 104, and a set of one or more base workers, such as worker processes 106a to 106n. Log write coordinator 102 is communicatively coupled to worker group 116a and 116b and coordinates writing log data from log buffer 108 to log file 114 between the worker groups.

The number of log write workers in a group may vary from implementation to implementation. In an embodiment, the number of log write workers is proportional to the number of available CPUs. For example, each group may have one log write worker per sixty-four or other number of CPUs. Any other proportion may also be used. Each CPU may be used to execute a different worker process in parallel.

Parallel Logical Write to a Single Log File

In an embodiment, the work for a single logical write of log data is distributed across multiple log write workers. A logical write of data corresponds to a single write request to write log data from log buffer 108 to persistent storage 112. The logical write is complete after all log data associated with the request is written to persistent storage 112. The logical write may comprise multiple physical writes to disk. Accordingly, each physical write of log data for a transaction completes before the logical write is considered complete. When the logical write completes, the database transaction that caused the logical write may be considered committed.

Figure 2:
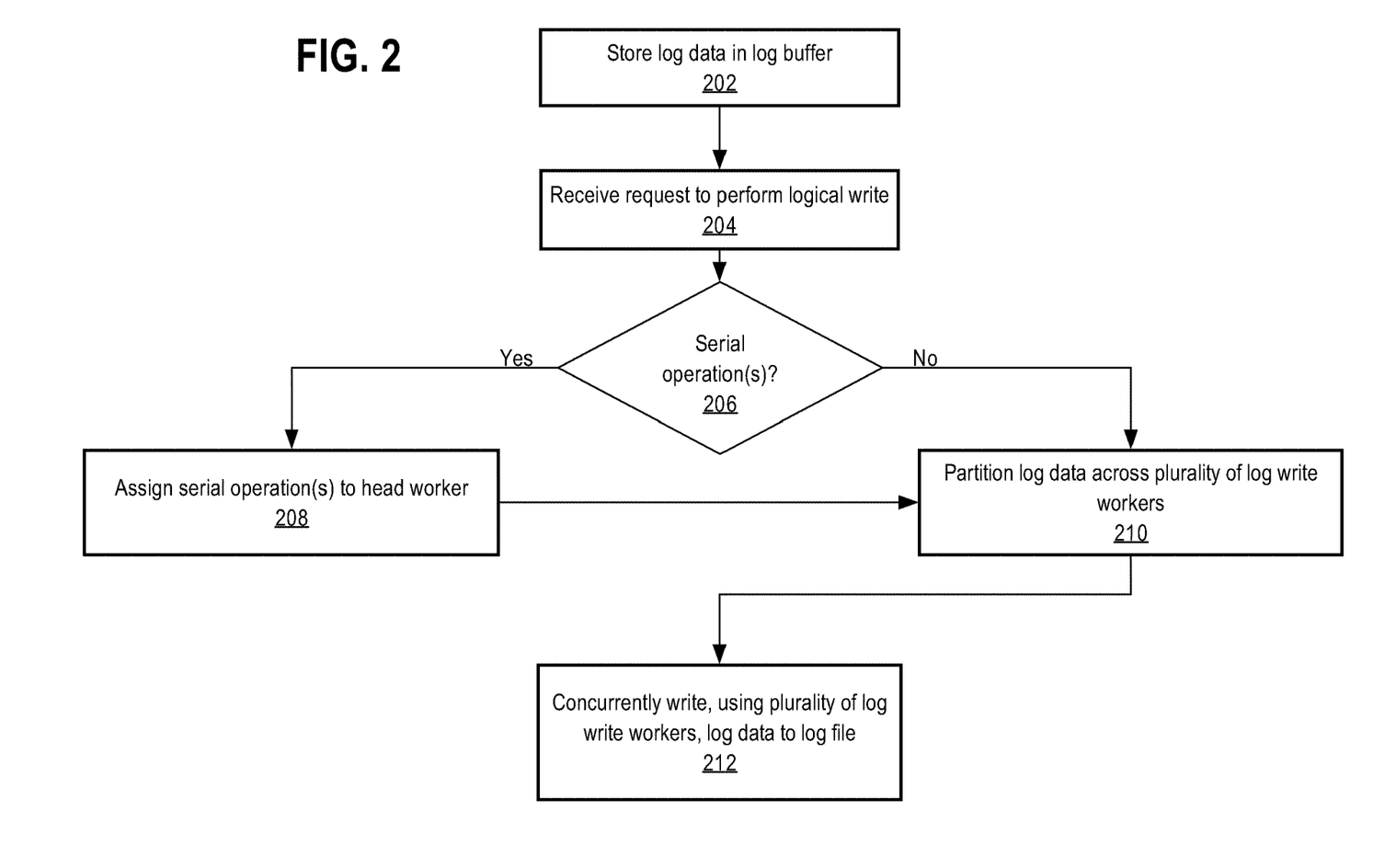
FIG. 2 is a flowchart illustrating a process for performing a parallel logical write of log data, according to an embodiment.

FIG. 2 is a flowchart illustrating a process for performing a parallel logical write of log data, according to an embodiment. In step 202, log data is stored in log buffer 108. In an embodiment, the log data is generated by one or more server processes of a DBMS. For example, the DBMS may receive a query to change a particular value in a database table. In response, the DBMS generates a redo record with a change vector describing the change to one or more data blocks of the database table. The DBMS stores the redo record in log buffer 108. The DBMS may continue to receive similar queries from one or more database clients, and continue to store the redo records in log buffer 108 as one or more DBMS server processes create the records. In other embodiments, a journaling file system may store journal records in log buffer 108 in response to requests to update a file system. The journal record may store advance copies of blocks that are later written to the file system or metadata that describes changes to the blocks.

In step 204, log write coordinator 102 receives a request to perform a logical write. In an embodiment, a request is sent to log write coordinator 102 in response to a transaction commit event. For example, a database query may explicitly or implicitly include a request to commit a transaction. In another embodiment, the log write coordinator 102 may periodically write log data when a threshold period of time has passed or a threshold amount of log data is stored in log buffer 108.

In step 206, log write coordinator 102 determines whether to perform any serial operations for the logical write. If there are serial operations associated with the logical write, then the process continues to step 208. Otherwise the process continues to step 210.

In step 208, the head worker process performs one or more serial operations at the appropriate time(s). Serial operations comprise operations that are performed in a particular order during the logical write. The serial operations may occur before and/or after any parallel operations are performed, depending on the particular implementation. For example, a particular task may such as updating the end of the log file, may be performed only after all parallel writes of log data have completed. Accordingly, step 208 may be performed before or after step 210 and 212. Techniques for synchronizing transitions between serial and parallel operations are described in further detail below.

The serial operations that are performed may also vary from implementation to implementation. For example, the head worker may update the end of the log file, In another example, the head worker may update a system change number (SCN) or other logical clock to indicate a current state of the database. As another example, the head worker may broadcast the SCN to one or more other database instances to notify other database instances about the current state of the database.

In step 210, log write coordinator 102 partitions the log writing work across a plurality of log write workers. In an embodiment, log data 110 is distributed evenly among processes 106a to 106n. Each worker process is responsible for writing a different portion of log data 110 to log file 114.

In an embodiment, the number of portions corresponds to the number of worker processes in a group. For example, log data 110 may be partitioned into n portions if there are n worker processes. Accordingly, each worker process performs a single physical write of a portion of log data 110. In an alternative embodiment, one or more of the worker processes may perform multiple physical writes of different portions of log data 110. For example, worker process 106a may write a first portion of log data 110. Once complete, worker process 106a may begin writing a second portion of log data 110.

In an embodiment, the size of each portion of log data is approximately equal. For example, log write coordinator 102 may divide the log data in approximately equal sized chunks based on the number of base workers in a group. Thus, each log write worker has a similar workload when writing its portion of the log data to persistent storage.

In step 212, the log write workers concurrently write log data 110 to log file 114. For example, worker process 106a may write a first portion of log data 110 to log file 114 at the same time worker process 106n writes a second portion of log data 110 to log file 114. Each worker process is responsible for writing at least one portion of log data 110 to log file 114. The head worker may also write one or more portions of the log data in addition to performing serial operations, depending on the implementation.

In an embodiment, each worker process at step 212 sets up at least one physical write for a portion of log data 110, performs the write for their respective portion of log data 110, and perform post-processing, if any. Each separate worker process may be executed by a different CPU. Thus, at least some of the physical writes of log data may be performed in parallel.

In an embodiment, for each physical write, an offset is computed that identifies a location to write to in the log file. The offset may be computed based on the size of other portions of the log data that are being written to the log file. For example, if worker process 106a is writing a first portion of the log file, and worker process 106n is writing a second portion of the log file that sequentially follows the first portion of the log file, then worker process 106n may compute the offset based on the size of the first portion of the log file. This prevents worker process 106n from overwriting the first portion of the log data in the log file.

When there are multiple portions of log data that precede a target portion for writing, the offset may be computed based on the combined size of the preceding portion. For example, the offset for a third portion of log data 110 may be computed based on the combined size of the first portion and second portion. Log write coordinator 102 may provide the size to each worker process. In response, each worker process computes the offset value identifying a location in log file 114 for performing a physical write.

Once the logical write is complete, the written log data may be cleared from the log buffer 108 and the transaction may be considered committed. In an embodiment, log write coordinator 102 sends a notification to one or more processes when the logical write is complete. Accordingly, any processes that are awaiting confirmation of the logical write may be queued to perform other transactions.

Assigning Log Workers to Buffer Strands

In some embodiments, log data may be distributed across a plurality of buffer strands while it is being stored at step 202. Each buffer strand may be a separate buffer cache or a partition of a buffer cache depending on the implementation.

In an embodiment, the number of buffer strands is proportional to the number of available CPUs and the number of log workers in a group. For example, there may be one strand per worker process and per sixty-four CPUs. Alternatively, there may be four strands per worker process and sixteen CPUs. Any other proportion may be used, and may vary from implementation to implementation.

In an embodiment, each worker process is assigned to one or more buffer strands during a logical write. The worker process performs a physical write for the log data in each worker strand to which it is assigned. For example, worker process 106a may be assigned to a first buffer strand and a second buffer strand while worker process 106n is assigned to a third buffer strand and a fourth buffer strand. In such a scenario, worker process 106a may perform a first physical write for a first portion of log data 110 stored in the first buffer strand and a second physical write for a second portion of log data 110 stored in the second buffer strand. Similarly, worker process 106n performs a third physical write for a third portion of log data 110 stored in the third buffer strand and a fourth physical write for a fourth portion of log data 110 stored in a fourth buffer strand.

Pipelining Writes Using Different Worker Groups

In an embodiment, multiple logical writes are pipelined across different groups of log write workers. Pipelining writes may increase log write throughput by allowing one logical write to begin before a previous logical write completes. The log data for the different logical writes may be concurrently written to a single log file.

Figure 3:
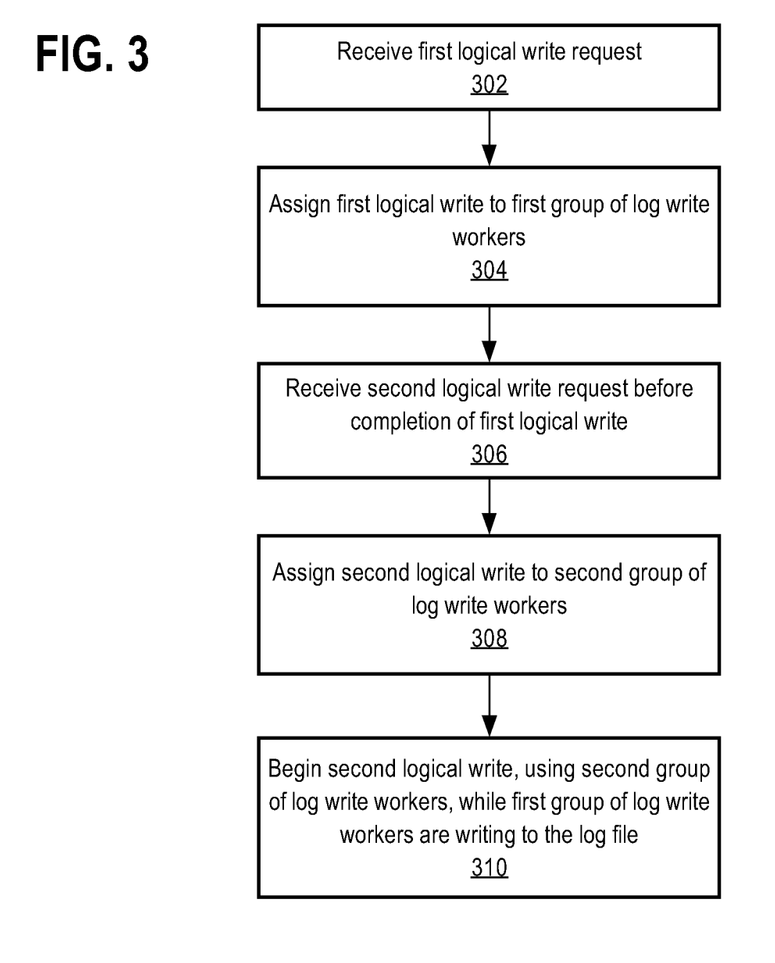
FIG. 3 is a flowchart illustrating a process for pipelining logical writes, according to an embodiment.

FIG. 3 is a flowchart illustrating a process for pipelining logical writes, according to an embodiment. In step 302, log write coordinator 102 receives a request to perform a first logical write. For example, a first DBMS process may request a log write as part of a commit transaction operation.

In step 304, log write coordinator 102 assigns the first logical write to a first group of log write workers. For example, log write coordinator 102 may assign writing of log data 110 to worker group 116a. In response, worker group 116a begins a parallel logical write of log data 110. Accordingly, worker group 116a partitions writing of log data 110 among the worker processes that belong to worker group 116a. These worker processes may concurrently write different portions of log data 110 to log file 114.

While the first logical write is being performed by worker group 116a, log buffer 108 may continue to accumulate log data or may include log data that was not included in the first logical write and has not been written to persistent storage. For example, one or more DBMS processes may generate log data 118 while the first logical write is being performed. In step 306, log write coordinator 102 may receive a second logical write request before the first logical write has completed.

In step 308, log write coordinator 102 assigns the second logical write to a second group of log write workers. For example, log write coordinator 102 may assign writing of log data 118 to worker group 116b. Each worker in the second worker group may identify the location to write to in the log file based at least in part on the size of the first logical write. For instance, the first base worker in the second group may compute an offset based on the size of the first logical write to avoid writing conflicts with the first group. The second worker process may compute the offset based on the size of the first logical write plus the portion of log data written by the first base worker. Accordingly, each process writes to a different part of the same log file.

In an embodiment, log write coordinator 102 generates each group by selecting log write workers from a pool of available worker processes. For example, log write workers that are not currently active performing a logical write may be queued for future tasks. When a logical write request is received, log write coordinator 102 selects a head worker and a plurality of worker processes from the pool to perform the logical write In step 310, worker group 116b begins the second logical write while group 116a is still performing the first logical write. To perform the logical write, worker group 116b may partition log data 118 among the worker processes that belong to worker group 116b. Multiple worker processes that belong to worker group 116b may begin to write portions of log data 118 to log file 114 in parallel. These processes may begin the physically writing portions of log data 118 while the log write workers of group 116a are still physically writing log data 110 to log file 114.

In an embodiment, a request to perform one or more other multiple writes may be received while the first and second logical write are still in progress. These logical writes may also be performed in parallel. For example a third and a fourth logical write may be received before the first and/or second logical write completes. The process may assign the third and fourth logical writes to worker groups in a similar manner as described above for the second logical write. The third and the fourth logical write may begin performing physical writing of portions of the log data before the first and second logical writes complete.

Pipelining Writes with Size Regulation

In some instances, multiple pipelined writes may have a large variance in the size of the writes. For example, log write coordinator 102 may receive a first logical write request to write log data 110. The size of this log data may be very large if a lot of log data has accumulated since the last transaction commit. Log write coordinator 102 may then receive a second logical write request shortly after receiving the first logical write request. The amount of log data accumulated since the first logical write request may be very small. Hence, the second logical write may complete before the first logical write. However, the second logical write is not considered complete until the first logical write completes. Therefore, allowing a group to unconditionally begin the second logical write may be inefficient since the group may write very little data to log file 114 and then wait for the first logical write to complete.

In an embodiment, log write coordinator 102 allows a new logical write if any of the following three conditions are met: (1) no logical writes are currently in progress, (2) the new logical write is sufficiently large, or (3) a timeout is reached while waiting for the new logical write to become larger. By preventing a new logical write to begin until one of the three conditions are satisfied, the likelihood of finishing the new logical write before a previous logical write is reduced. Accordingly, resources may be more optimally utilized by increasing the amount of log data that gets written to the log file in parallel and reducing process inactivity.

Figure 4:
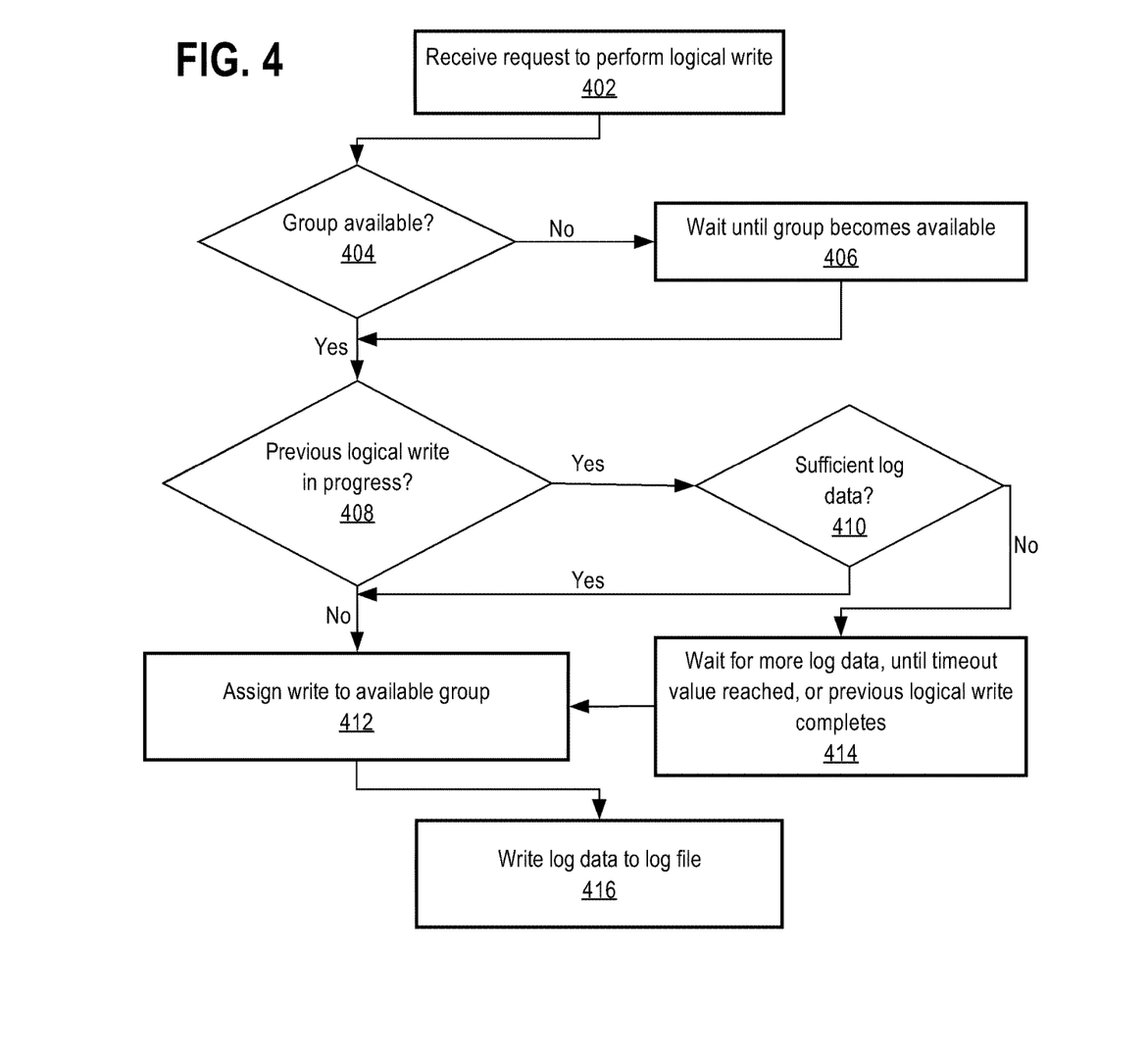
FIG. 4 is a flowchart illustrating a process for pipelining logical writes with size regulation, according to an embodiment.

FIG. 4 is a flowchart illustrating a process for pipelining logical writes with size regulation, according to an embodiment. In step 402, log write coordinator 102 receives a request to perform a new logical write, herein referred to as a target logical write. In step 404, log write coordinator 102 determines whether a group is available to perform the logical write. If a group is not available, then in step 406, log write coordinator 102 waits until a group becomes available. If a group is already available, then, in step 408, the log write coordinator 102 determines whether a previous logical write is currently in progress. If no other logical writes are in progress, then the process continues to step 412, and a group is assigned to perform the logical write.

If a previous logical write is currently in progress, then, in step 410, log write coordinator 102 determines whether there is sufficient log data to begin the target logical write. If amount of data in log buffer 108 for target logical write is sufficiently large, then the process continues to step 412, and a group is selected to perform the target logical write. The size threshold may vary from implementation to implementation. For example, the size may be a certain percentage of the size of the previous logical write. In another embodiment, the size threshold may be a fixed amount of data. If the amount of log data does not satisfy the size threshold, then the process continues to step 414.

In step 414, log write coordinator 102 waits for more log data, until a timeout value is reached or all previous logical writes have completed before beginning the new logical write. Once one of these conditions is satisfied, then the process continues to step 412, and log write coordinator 102 selects a group to perform the target logical write.

In step 416, the log data associated with the target logical write is written. This may be performed concurrently with other logical writes that are in progress. For example, worker group 116b may begin writing log data 118 to log file 114 while worker group 116a is still writing log data 110 to log file 114. In addition, each logical write may be partitioned across multiple processes within a group.

Synchronization within a Single Logical Write

In an embodiment, log write workers within a single group are synchronized to perform a parallel logical write. The log write workers may be synchronized in different ways. For example, worker processes 106a to 106n may wait for each other, head worker 104 may wait for worker processes 106a to 106n, and worker processes 106a to 106n may wait for head worker 104. Once the logical write is complete, the log write workers may be queued to perform other logical writes.

The manner in which the log write workers are synchronized may vary from implementation to implementation. For example, a variant of a sense reversing centralized barrier may be used to synchronize the log write workers. When a worker process has completed a physical write for a portion of the log data, the worker may update a shared counter. For serial tasks, the head worker may update a flag. The log write workers may determine when to perform tasks based on such flags and shared counters.

In an example embodiment, if a serial task is performed before performing the parallel physical writes, worker processes 106a to 106n may wait to write log data 110 until head worker 104 sets a flag. If a serial task is performed after the parallel physical writes, head worker 104 may wait to perform the serial task until after the shared counter indicates all of the physical writes are complete. Log write coordinator 102 may determine that the logical write is complete when the shared counter indicates that all logical writes are complete and any flags indicate that serial tasks are complete.

Synchronization Across Multiple Logical Writes

When there are multiple outstanding logical writes, log write coordinator 102 may synchronize certain matching phases of each logical write to ensure correct order of execution. In an embodiment, log write coordinator 102 coordinates matching serial operations such that the serial operations are performed in the same order as the logical writes started.

In an example embodiment, log write coordinator 102 synchronizes updating a logical clock in memory, such as an SCN, across different logical writes. The SCN is a counter that indicates which log records have been written to persistent storage, a set of log worker. A set of log records may be associated with a range of SCNs. All log records that have an SCN below the counter in memory are guaranteed to be written to disk. Since later portions of the log may actually be written first (leaving holes), we have to enforce ordered updates of the value to honor the guarantee. For example, worker group 116a may update the SCN only after all physical writes of log data 110 are complete to guarantee there are no holes in the log. Worker group 116b may similarly update the end of the log file with an SCN after all physical writes of log data 118 are complete. In some instances, worker group 116b may finish writing log data 118 to log file 114 before worker group 116a finishes writing log data 110 to log file 114. To ensure there are no missing portions of the log, log write coordinator 102, prevents worker group 116b from updating the SCN number until worker group 116a updates the SCN number.

In an embodiment, log write coordinator 102 assigns each logical write a sequential number. To synchronize across multiple logical writes, log write coordinator 102 only allows logical writes with the appropriate value to execute the ordered phase. For example, worker group 116a may work on first logical write assigned a first number while worker group 116b concurrently performs a second logical write assigned a second number. Log write coordinator 102 may allow the head worker in group 116b to update the end of a log file after log write coordinator 102 determines that all logical writes associated with previous logical write numbers, such as the logical write performed by group 116a, are complete.

Activating and Deactivating Worker Groups

In an embodiment, log write coordinator 102 is responsible for activating and deactivating log write worker processes. For example, log write coordinator 102 may generate the log write worker processes, cause the worker processes to sleep, and/or destroy the worker processes.

In an embodiment, when the DBMS or journaling file system starts up and before it is active, log write coordinator 102 generates the groups of log write workers. The number of groups and workers may be predefined by default or by a system administrator. In an alternative embodiment, log write coordinator 102 may generate the groups of log write workers on demand.

When the system is active, log write requests are sent to log write coordinator 102, which then hands off the work to any worker group that is not already doing a logical write. The log write coordinator 102 may also wait to hand off the work to a worker group until one of the three conditions above The selected worker group performs the parallel logical write and notifies log write coordinator 102 when the logical write is complete.

Once the logical write is complete, the worker group that performed the logical write goes to sleep until log write coordinator 102 hands it another log write request. If the DBMS or journaling file system is shut down, log write coordinator 102 handles waiting for all outstanding writes to complete and destroys all the log write workers once complete.

Adaptive Usage of Multiple Log Writers

Using multiple log writers may not be more advantageous than using a single log writer in all scenarios. For example, handing off a log write request from log write coordinator 102 to a worker groups may add latency due to synchronizing the log write between multiple processes. If not much logging activity is occurring, few writes may be pipelined and the benefits of parallelizing the writes may be negated.

In order to further optimize log writing, the usage of multiple log writing processes may be dynamically enabled or disabled based on various metrics. If the metrics indicate that a single process would be more effective, then the system may disable parallel log writing. If the metrics indicate that multiple processes would be more effective, then the system may enable parallel log writing.

When parallel log writing is disabled, log write coordinator 102 may perform the write of log data itself. This eliminates any overhead associated with coordinating log writing between a plurality of processes. When parallel log writing is enabled, log write coordinator 102 hands off log writing to one or more groups per the techniques described above.

The metrics that are maintained may vary from implementation to implementation. For example, the metrics may include, without limitation, the scheduling delay to perform a parallel write, the log write latency, and/or the log data generation rate.

In an embodiment, if the scheduling delay is larger than a threshold when compared to the log write latency, the system disables parallel log writing and uses only a single log writer, such as log write coordinator 102, to perform the logical write. Conversely, parallel writing is enabled if the scheduling delay compared to the log write latency is below a threshold.

In another embodiment, if the log data generation rate is higher than a threshold, then parallel writing is enabled, and log write coordinator 102 hands the logical write off to a group of log write workers. Conversely, the system may disable parallel logical writes if the frequency with which log data is generated is lower than a threshold.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
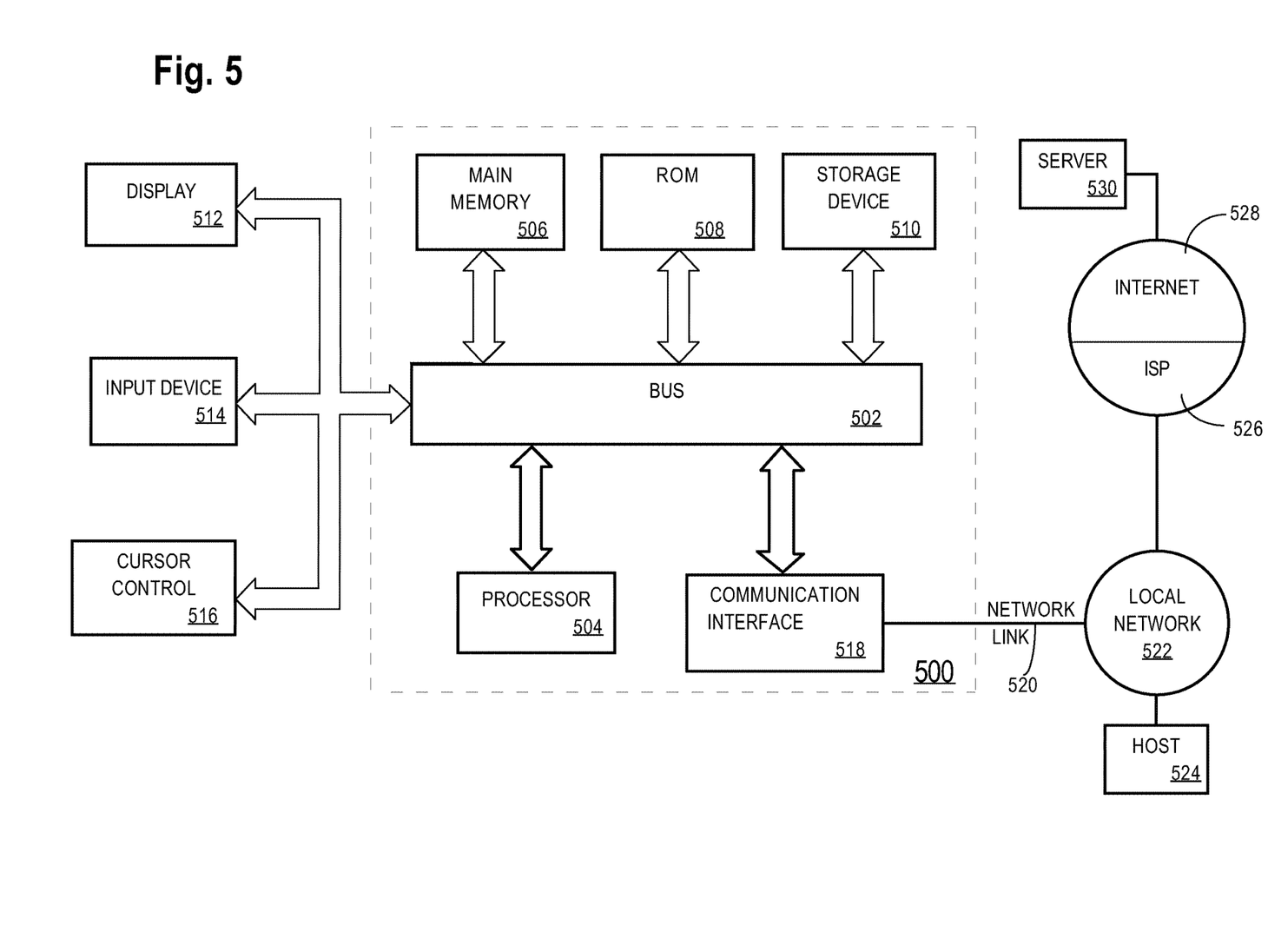
FIG. 5 is a block diagram depicting a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing log data in one or more buffers;
    receiving a first request to write first log data for one database to one log file stored in persistent storage;
    in response to the first request:
        determining a first location in the log file and a second location in the log file for respectively writing a first portion and a second portion of the first log data to preserve an ordering of the first and second portions, wherein the second location is based on a size of the first portion;

writing, using a first process, the first portion of the first log data in the one or more buffers to said first location in the log file in persistent storage;

while the first portion of the first log data is being written to the first location in the log file, concurrently writing, using a second process, the second portion of the first log data in the one or more buffers to said second location in the log file in persistent storage; and after determining that the first portion and the second portion are written to the log file, sending a notification that the first log data is written to the log file;

determining based on one or more collected metrics, to disable parallel log writing;

after determining to disable parallel log writing receiving a second request to write second log data to the log file;

in response to receiving the second request, writing all of the second log data to the log file;

wherein the method is performed by one or more computing devices.

2. The method of claim 1, further comprising:
generating a group of log write workers;
wherein the group of log write workers comprises a head worker process and a plurality of base worker processes;
wherein the first process and the second process are base worker processes in the group of log write workers;
wherein each base worker process of the plurality of base worker processes performs at least one physical write of a respective portion of the first log data to the log file; and
performing one or more serial operations using the head worker process, wherein the one or more serial operations includes sending the notification.

3. The method of claim 1, further comprising:
receiving a third request to write third log data to the log file;
wherein the third log data is different than the first log data; and
while the first log data is being written to the log file, writing the third log data to the log file.

4. The method of claim 3, wherein writing the third log data to the log file comprises:
writing, using a third process, a first portion of the third log data to the log file; and
writing, using a fourth process, a second portion of the third log data to the log file.

5. The method of claim 3, further comprising:
generating a group of processes to write the first log data; and
generating a second group of processes to write the third log data;
wherein the group comprises a first head worker process to perform one or more serial operations associated with the first request;
wherein the second group comprises a second head worker process to perform one or more serial operations associated with the third request;
wherein the second head worker process waits for the first head worker process before performing at least one serial operation.

6. The method of claim 1, further comprising:
while the first portion of the first log data and second portion of the first log data are being written to the log file, writing, using a third process, a third portion of the first log data to the log file.

7. The method of claim 1, further comprising:
receiving a third request to write third log data to the log file; and
waiting to write the third log data until a size associated with the third log data satisfies a threshold.

8. The method of claim 1, wherein:
said writing all of the second log data to the log file is performed by a third process.

9. The method of claim 1, wherein
said determining the second location in the log file is based on a size of the first portion of the log file.

10. The method of claim 1, wherein the first portion of the first log data is stored in a first strand of a log buffer; wherein the second portion of the first log data is stored in a second strand of the log buffer.

11. The method of claim 1, wherein the first process is executed by a first central processing unit and the second process is executed by a second central processing unit.

12. Non-transitory computer-readable media storing instructions that, when executed by one or more processors, cause:
storing log data in one or more buffers;
receiving a first request to write first log data for one database to one log file stored in persistent storage;
in response to the first request:
determining a first location in the log file and a second location in the log file for respectively writing a first portion and a second portion of the first log data to preserve an ordering of the first and second portions;
writing, using a first process, the first portion of the first log data in the one or more buffers to said first location in the log file in persistent storage;
while the first portion of the first log data is being written to the first location in the log file, concurrently writing, using a second process, the second portion of the first log data in the one or more buffers to said second location in the log file in persistent storage; and
after determining that the first portion and the second portion are written to the log file, sending a notification that the first log data is written to the log file;
determining based on one or more collected metrics, to disable parallel log writing;
after determining to diable parallel log writing, receiving a second request to write second log data to the log file;
in response to receiving the second request, writing all of the second log data to the log file.

13. The non-transitory computer-readable media of claim 12, wherein the instructions further cause:
generating a group of log write workers;
wherein the group of log write workers comprises a head worker process and a plurality of base worker processes;
wherein the first process and the second process are base worker processes in the group of log write workers;
wherein each base worker process of the plurality of base worker processes performs at least one physical write of a respective portion of the first log data to the log file; and
performing one or more serial operations using the head worker process, wherein the one or more serial operations includes sending the notification.

14. The non-transitory computer-readable media of claim 12, wherein the instructions further cause:

receiving a third request to write third log data to the log file;
wherein the third log data is different than the first log data; and
while the first log data is being written to the log file, writing the third log data to the log file.

15. The non-transitory computer-readable media of claim 14, wherein writing the third log data to the log file comprises:
    writing, using a third process, a first portion of the third log data to the log file; and
    writing, using a fourth process, a third portion of the third log data to the log file.

16. The non-transitory computer-readable media of claim 14, wherein the instructions further cause:
    generating a group of processes to write the first log data;
        generating a second group of processes to write the third log data;
        wherein the group comprises a first head worker process to perform one or more serial operations associated with the first request;
        wherein the second group comprises a second head worker process to perform one or more serial operations associated with the third request;
        wherein the second head worker process waits for the first head worker process before performing at least one serial operation.

17. The non-transitory computer-readable media of claim 12, wherein the instructions further cause:
    while the first portion of the first log data and second portion of the first log data are being written to the log file, writing, using a third process, a third portion of the first log data to the log file.

18. The non-transitory computer-readable media of claim 12, wherein the instructions further cause:
    receiving a third request to write third log data to the log file; and
    waiting to write the third log data until a size associated with the third log data satisfies a threshold.

19. The non-transitory computer-readable media of claim 12, wherein:
    said writing all of the second log data to the log file is performed by a third process.

20. The non-transitory computer-readable media of claim 12, wherein said determining the second location in the log file is based on a size of the first portion of the log file.

21. The non-transitory computer-readable media of claim 12, wherein the first portion of the first log data is stored in a first strand of a log buffer;
    wherein the second portion of the first log data is stored in a second strand of the log buffer.

22. The non-transitory computer-readable media of claim 12, wherein the first process is executed by a first central processing unit and the second process is executed by a second central processing unit.

23. The method of claim 1 wherein said one or more collected metrics comprises at least one of: a scheduling delay to perform a parallel write, a log write latency, or a log data generation rate.

* * * * *

UNITED STATES PATENT AND TRADEMARK OFFICE
CERTIFICATE OF CORRECTION

PATENT NO.      : 10,706,009 B2
APPLICATION NO. : 13/831489
DATED           : July 7, 2020
INVENTOR(S)     : Minh et al.

Page 1 of 1

It is certified that error appears in the above-identified patent and that said Letters Patent is hereby corrected as shown below:

In the Specification

In Column 6, Line 67, delete "write" and insert -- write. --, therefor.

In the Claims

In Column 13, Line 18, in Claim 1, delete "writing" and insert -- writing, --, therefor.

In Column 13, Line 52, in Claim 5, after "generating a" insert -- first --.

In Column 13, Line 56, in Claim 5, after "wherein the" insert -- first --.

In Column 14, Line 47, in Claim 12, delete "diable" and insert -- disable --, therefor.

In Column 15, Line 12, in Claim 15, delete "third" and insert -- second --, therefor.

In Column 15, Line 16, in Claim 16, after "generating a" insert -- first --.

In Column 15, Line 19, in Claim 16, after "wherein the" insert -- first --.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*